June 28, 1938. C. F. FOLEY ET AL 2,122,342
VEHICLE LAMP
Filed Nov. 26, 1934 3 Sheets-Sheet 1
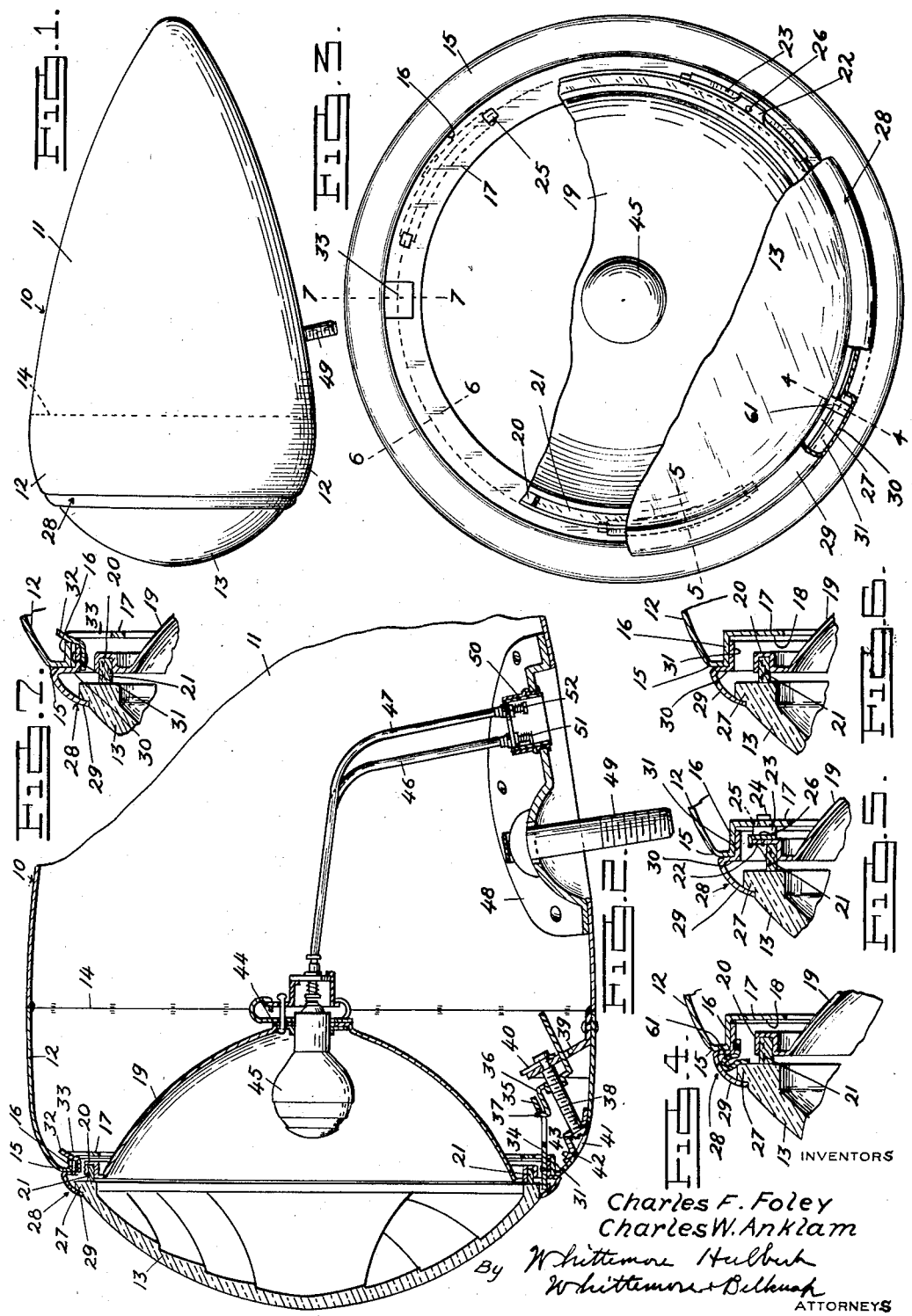
INVENTORS
Charles F. Foley
Charles W. Anklam
By Whittemore Hulbert
Whittemore & Belknap
ATTORNEYS June 28, 1938. C. F. FOLEY ET AL 2,122,342
VEHICLE LAMP
Filed Nov. 26, 1934 3 Sheets-Sheet 2
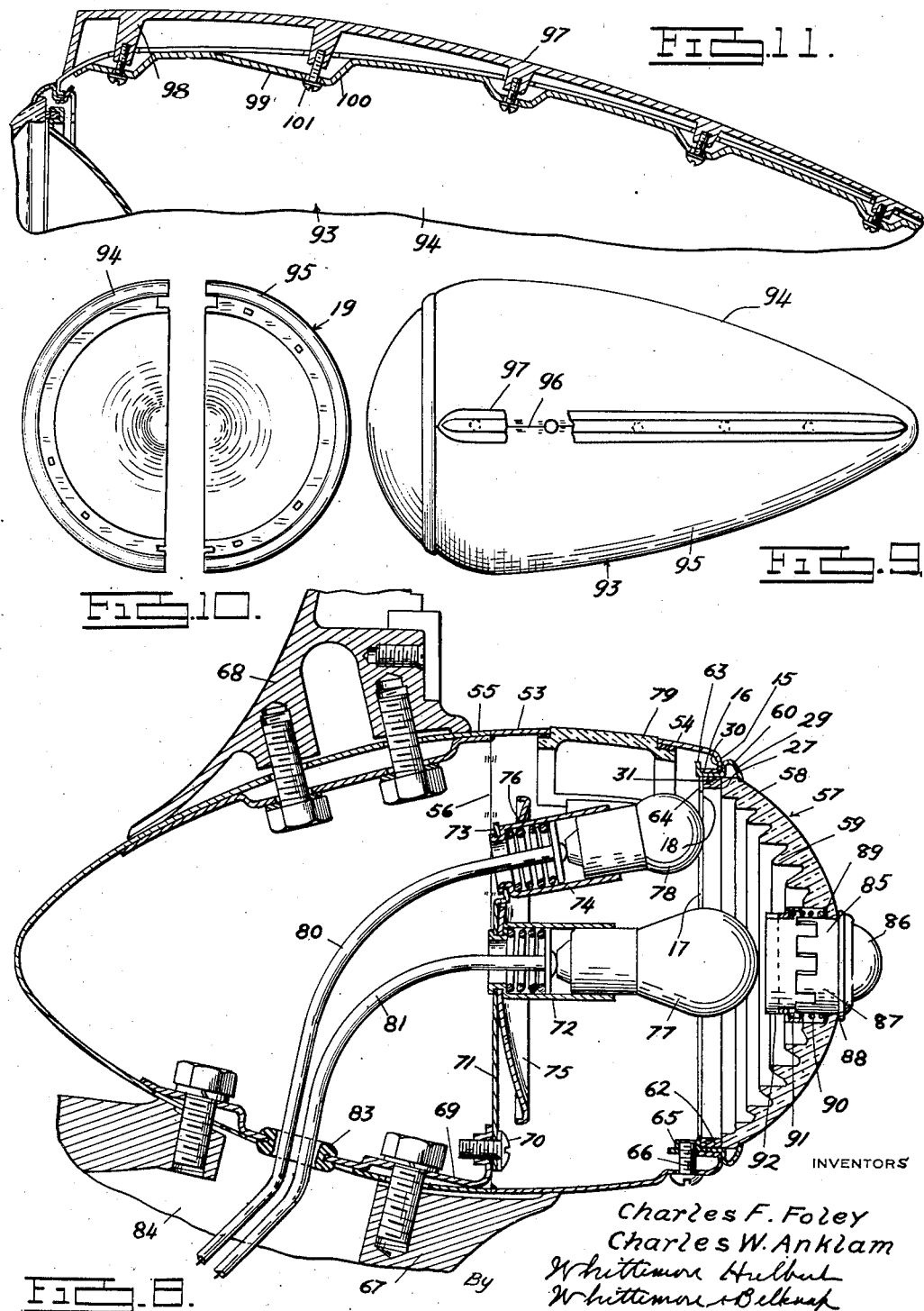
INVENTORS
Charles F. Foley
Charles W. Anklam
By Whittemore Hulbert
Whittemore & Belknap
ATTORNEYS

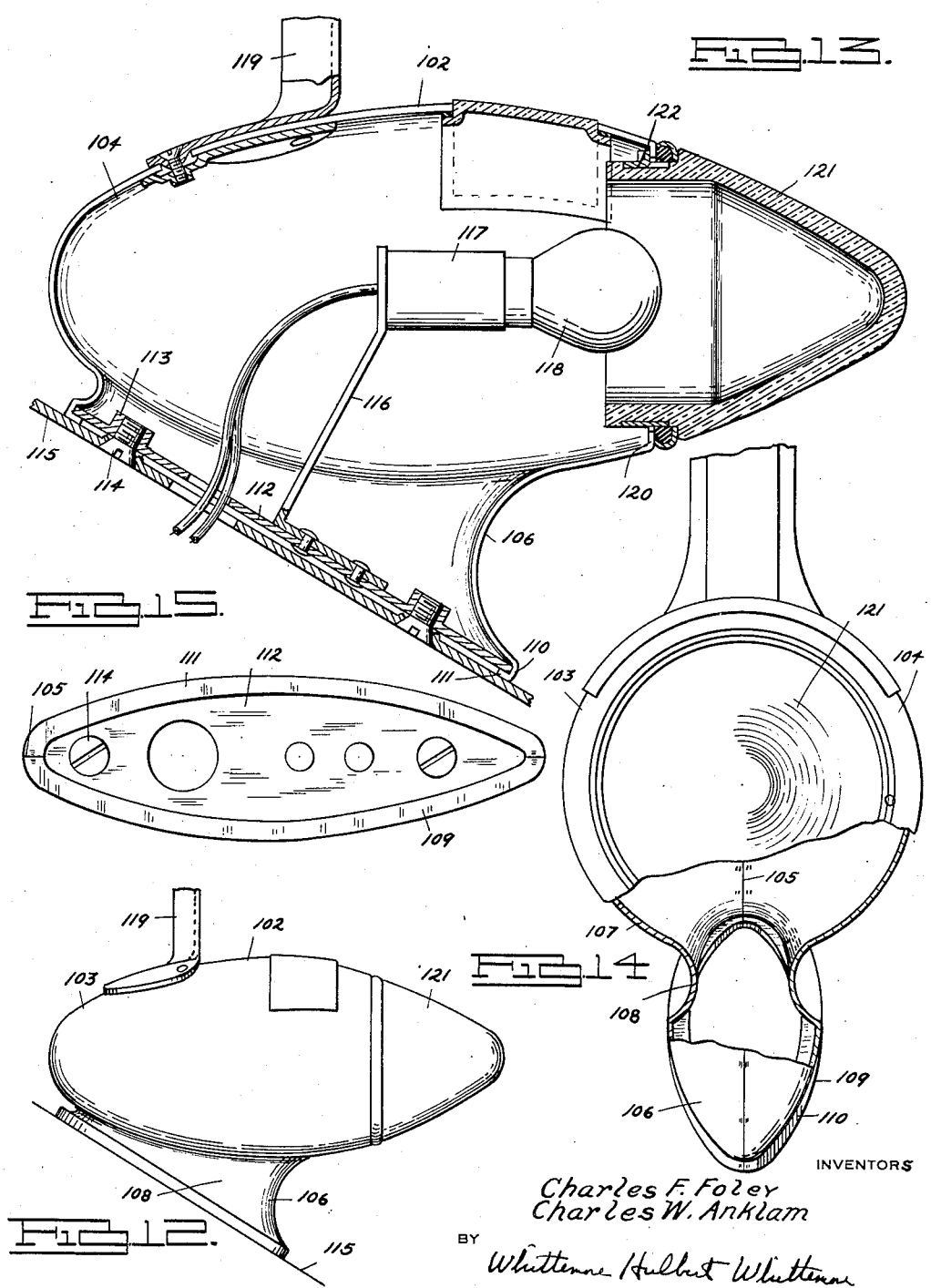

Patented June 28, 1938

2,122,342

UNITED STATES PATENT OFFICE 2,122,342

VEHICLE LAMP

Charles F. Foley and Charles W. Anklam, Detroit, Mich., assignors to C. M. Hall Lamp Company, Detroit, Mich., a corporation of Michigan Application November 26, 1934, Serial No. 754,900

3 Claims. (Cl. 240—41.5)

The invention relates to vehicle lamps and is applicable not only to head lamp construction but is also useful in providing improved auxiliary lamp equipment such, for example, as the side lamps and tail lamps of automobiles and other vehicles.

The trend of extreme streamline design in automobiles has been carried to the lamp equipment of motor vehicles and there has been an increased demand for vehicle lamps of elongated fully streamlined construction having a rounded front portion which tapers gradually towards the rear in the well known streamline fashion. Such head lamp constructions have in the past complicated the manufacture since they necessitate the provision of a deep-drawn outer casing, the open end of which could be fabricated only to a limited extent because of the limitations imposed by the drawing dies. Consequently the reflector unit and lens unit which are secured to the casing required considerable modification in order to permit the assembly of the various parts into a completed lamp structure.

The primary object of our invention is to improve the construction of streamlined vehicle lamps, although in attaining these results we have made an invention which is useful also for vehicle lamps of other designs.

One of the objects of the invention is to obtain an improved structural relationship between the casing, reflector unit and lens unit whereby the manufacture and assembly of these units is facilitated while at the same time providing an enhanced appearance of the lamp construction.

One of the features of this invention is the provision of a lamp casing of the elongated streamline type in which the open end adapted for receiving the reflector and lens unit is provided with an integral inturned flange, the outer face of which is arranged within the casing and serves as a means for seating the reflector and securing the lens in position.

Another important feature of this invention is the construction of the lamp casing of two separate sections, each of which is suitably fashioned by a series of drawing operations to produce the desired contour and then uniting these formed sections by butt-welding the adjacent edges to form a complete integrated water-tight body unit. The complete body casing may therefore be extremely streamlined to have an intermediate section of the largest diameter with the two sections tapering inwardly from this point and at the same time permit the formation of a desirable reflector seat within the contour of the body.

Other features of the construction will be more apparent after considering the detailed description hereinafter given relating to certain embodiments of the invention illustrated in the accompanying drawings, wherein—

Figure 1 represents a side elevation of a head lamp;

Figure 2 is a longitudinal section through the front portion of the head lamp;

Figure 3 is a front view of the lamp with portions broken away to show details of construction;

Figures 4, 5, 6 and 7 are fragmentary cross sections on the lines 4—4, 5—5, 6—6 and 7—7 respectively of Figure 3;

Figure 8 is a longitudinal section through a modified construction designed as a tail lamp;

Figure 9 is a top plan view of a modified head lamp with parts broken away to show the weld;

Figure 10 is an end view of the two casing sections before welding;

Figure 11 is a longitudinal section through the upper portion of the lamp;

Figure 12 is a side elevation of a modified form of tail lamp;

Figure 13 is a longitudinal section through the same;

Figure 14 is an end elevation of the outer casing showing the complementary half sections thereof welded in a vertical plane; and Figure 15 is a bottom view of the portion of the lamp casing forming the supporting bracket.

Referring first to the head lamp construction as illustrated in Figures 1 to 6, the lamp casing 10 comprises a rear section 11 and front section 12, the adjacent edges of which represent substantially the maximum diameter of the casing. The rear section 11 is elongated in extreme streamline fashion tapering inwardly to the rounded rear portion and may conveniently be formed from pressed sheet metal. The forward section 12 is also formed of pressed sheet metal and tapers inwardly to a certain extent in order to conform with the contour of the rounded lens 13 in streamline fashion. The front and rear sections are integrally united at 14 preferably by butt-welding, and by removing the flashing resulting from the weld a smooth continuous outer contour of the body is obtained.

The front end of the forward section 12 has a curved portion 15 and the metal is then bent rearwardly forming the annular wall 16. This wall then extends radially inward forming a flange 17, the outer surface 18 of which is within the outer casing and forms in effect a recessed seat. The flange 17 is suitably apertured to receive the mounting devices for the reflector and lens units as hereinafter more fully set forth.

19 represents the reflector having at its outer margin the annular recess 20 for receiving the reflector gasket 21 and having a series of circumferentially spaced ears 22 (preferably three) secured to suitable spring clips 23. The spring clips may be of various constructions, but as shown consist of spring strips, the ends 24 of which extend through elongated apertures 25 in the flange 17. The strips are bowed forwardly from the flange and are secured to the ears by rivets 26 or other suitable securing means. This construction permits the reflector unit to be urged outwardly by the tension of the spring clips but to move inwardly under the influence of outside pressure, thereby causing the ends 24 to slide in the elongated recess 25.

The lens 13 may be of any desired construction but preferably is outwardly curved to conform with the streamline design and provided with a flange 27. For securing the lens to the lamp casing and also forming a decorative band there is provided a metallic ring 28. This member is annular in form and the decorative band portion 29 is rounded to conform approximately with the outer contour of the lamp but the curvature is preferably increased to give the appearance of a bead. The outer periphery of the band is pressed radially inwardly forming a seat 30 and is then extended rearwardly as an annular flange 31 of a diameter adapted to slide within the annular wall 16 of the casing. The lens is secured to the metallic ring 28 by suitable retaining clips 61. A projecting hinge member 32 is secured to the flange 31 preferably at the upper end thereof and is adapted to be inserted through an aperture 33 in the casing flange 17 when the lens is to be inserted in position. At the bottom of the flange 31 there is secured an apertured strip 34 inwardly bent at the end portion 35. For locking the lens in position there is provided a catch 36 having a hooked portion 37 adapted to engage the apertured strip 34. The hook is threadedly mounted on a screw 38, the inner end of which extends through an aperture in a bracket 39 which in turn is secured within the forward casing section 12. The screw has an annular groove therein for receiving the retaining clip 40 to rotatably mount the screw in the bracket. The casing section 12 is apertured at 41 to receive the head of the screw and a bracket 42 having a recessed seat 43 is secured to the casing for engaging the head of the screw. The screw is preferably provided with a left-hand thread so that by turning the same in the usual manner for tightening, the catch 36 will be moved inwardly thus drawing the lens unit against its seat. The lens bears against the gasket 21 and forms a tight seal, while the resilient spring clips 23 seating on the casing flange 17 urge the reflector outwardly into engagement with the lens.

The reflector is provided with a suitable socket 44 for mounting the lamp bulb 45 and connecting the same with the conductors 46 and 47. Within the rear section 11 of the casing is provided a suitable bracket 48 to which is connected the supporting post 49. The bracket 48 is also provided with a suitable socket 50 having terminals 51 and 52 therein connected to the conductors 46 and 47 respectively.

A modified construction embodying our invention is shown in Figure 8. This lamp is designed as a tail lamp for automobiles, and in such constructions it is not necessary that the reflector be arranged in as accurate relationship to the lamp bulb as in a head lamp construction. The body 53 of the lamp is again made-up from two separate sections, and as illustrated it is provided with front and rear sections 54 and 55 welded together at 56 at the point representing substantially the largest diameter of the lamp casing. The front section 54 has the rounded front edge portion 15, the annular wall 16 and the radial flange 17 in the same manner as the head lamp first described. The front face 18 of the flange 17 forms a seat within the lamp body and in this instance the lens unit 57 bears against the same. The lens unit comprises the lens 58 curved to conform to the streamline design and provided on its inner surface with annular flutes 59 for properly distributing the light. A band or ring 60, similar to the ring 28 previously described, has a rounded surface 29 engaging the lens flange 27 and a radially inturned portion 30 adapted to engage the rounded front edge 15 of the casing. The ring 60 also has the annular flange 31 for slidingly engaging the annular wall 16. The lens is secured to the ring by suitable retaining clips 61 as previously described and illustrated in Fig. 4. An annular gasket 62 is placed behind the lens within the annular flange 31 for engaging the seat 18. The ring 60 has a tongue 63 projecting from the upper edge of the flange 31 adapted to be inserted through the notch 64 in the flange and engage behind the annular wall 16. The bottom of the ring has a recessed lug 65 for receiving the end of the locking screw 66 which extends upwardly through and is threadedly mounted in the bottom wall of the casing.

The rear section 55 of the lamp casing is secured to a suitable supporting bracket 67 which as illustrated is suitably streamlined for appearance. A license mounting bracket 68 is also secured to the rear section of the casing to extend upwardly therefrom. Within the lamp casing and mounted on the rear section thereof is an inner bracket 69 to which is attached by screws 70 a bulb supporting frame 71. This frame is apertured centrally of the lamp casing for receiving the lamp socket 72 and has an apertured rearwardly inclined face 73 for mounting an auxiliary socket 74. A curved reflector 75 is secured to the frame 71 and is concentric to the central socket 72 and provided with an aperture 76 through which the auxiliary socket 74 projects. Lamp bulbs 77 and 78 are inserted in the respective sockets 72 and 74. The upper surface of the front section of the casing is apertured to receive a transparent unit 79 through which light is transmitted to the license plate on the bracket 68. Electric conductors 80 and 81 are connected to the sockets 72 and 74 and extend through an apertured bushing 83 in the casing and through the hollow interior 84 of the bracket 67. In the preferred arrangement, the upper bulb 78 serves as the normal tail light and also supplies the light for illuminating the license. The central bulb 77 is designed to be used as a stop light and is preferably of higher power.

85 represents a reflex button unit mounted centrally within the lens 58. The unit has a glass reflector 86 adapted to pick up the light of the following car and return it to the driver giving a red signal even though the tail lamp may not be lighted. The body 87 of the unit has a flange 88 for engaging the outer surface of the lens.

For retaining the unit in position on the lens there is provided a gasket 89, a spring 90 and a retainer ring 91. The ring is insertable over the lugs 92 on the body and engageable with the same upon a partial revolution of the ring. The reflex unit is thus mounted directly upon the tail lamp lens.

A further modified construction embodying our invention is shown in Figures 9, 10 and 11. In this case the lamp casing 93 is formed of two complementary stampings 94 and 95 welded together longitudinally as indicated at 96, the assembled casing being similar to that illustrated in Figure 2. If desired, the longitudinal seam resulting from the weld may be hidden by providing a suitable ornamental strip 97. As indicated, this strip has a series of downwardly projecting bosses 98 which are inserted through corresponding apertures in the casing. Within the casing a strip 99 is arranged having a series of pressed out portions 100 apertured to receive the retaining screws 101 which threadedly engage the bosses. In this construction the front end flanges forming the seat for the lens and reflector units are similar to that shown in Figure 2.

A modified tail lamp construction is illustrated in Figures 12 to 15. The lamp casing 102 is formed of two complementary stampings 103 and 104 welded together longitudinally as indicated 105, the construction of the casing being similar in some respects to that shown in Figures 9 and 10. One of the principal features of the modified tail lamp construction resides in the fact that the supporting bracket 106 for the lamp is formed integral with the casing sections. Thus as shown the stamping 103 has its outer convex contour 107 formed with a return-bent portion 108 as shown in Figure 14 which extends downwardly to form an elliptical-shaped base 109 extending at an angle with respect to the longitudinal axis of the lamp casing. The marginal base portions 110 of the bracket are then inwardly bent forming a flange 111 for retaining the base plate 112. The base plate is provided with a series of apertures as illustrated in Figure 15. The outer apertures have struck-up portions 113 threaded to receive retaining screws 114, by means of which the bracket may be secured to its support 115 which may be for example the fender of an automobile. A supporting bracket 116 is secured to the base plate 112 and carries the socket 117 for the lamp bulb 118. 119 represents a license plate bracket attached to the upper surface of the casing.

The complementary casing sections 103 and 104 have their edge portions welded together in a vertical plane through the longitudinal axis of the casing. Each section has the inwardly turned front flange 120 which extends in a plane perpendicular to the longitudinal axis. A lens 121 is adapted to be inserted in the front of the casing and to be retained in position by a locking ring 122 which engages behind the flange 120.

Instead of being provided with the lens as illustrated the lamp may also be provided with other lens constructions adapted to be retained in position in a manner similar to that illustrated in Figure 8 or in Figure 2. It will be observed that the modified tail lamp of Figures 12 to 15 has the casing sections welded together in the same manner as illustrated in Figure 10 but differs from that construction by having the integral bracket portions which when welded form the supporting bracket.

In the preceding description we have shown several embodiments of our invention which while differing considerably in certain respects have the common feature of providing an elongated streamline lamp casing in which the open end thereof may be provided with the desired flange arrangement for adapting the casing to be simply and effectively united with a replaceable lens.

What we claim as our invention is:

1. A vehicle lamp comprising a casing having an open end and provided with a radially extending flange within the same, a lens, a ring secured to the periphery of said lens having an annular flange slidably engaging within said casing, said ring having a band portion extending between said lens and the outer contour of said casing, a fastening member on said ring engageable with said casing flange, a locking member carried by said ring and an adjustable latch engaging said locking member.

2. A vehicle lamp comprising a casing having an open end and provided with a radially extending flange spaced inwardly within the casing from said open end and connected thereto by an axially extending portion, a reflector having a peripheral flange within said casing, a lens secured to said casing, a ring secured to the periphery of said lens, and having a portion fitting within said axially extending portion a gasket between said lens and said reflector flange and resilient means between said reflector flange and said radial casing flange.

3. A vehicle lamp comprising a casing having an open front end, said casing having a return bent portion forming an annular wall and a laterally bent portion forming a radial flange within said casing, a lens, a ring secured to the periphery of said lens having an annular extension adapted to engage said annular casing wall, said ring having an annular band of rounded cross section extending between the outer surface of said lens and the open end of said casing, a projecting member on said ring for engaging said casing, a reflector having a peripheral flange between said lens and said radial casing flange, resilient means between said reflector flange and said radial casing flange and adjustable means on said casing engageable with said ring for moving the same into engagement with said casing.

CHARLES F. FOLEY.
CHARLES W. ANKLAM.